United States Patent [19]
Barton et al.

[11] Patent Number: 5,376,385
[45] Date of Patent: Dec. 27, 1994

[54] RELEASABLY BOUND ACTIVE MATERIALS

[76] Inventors: Derek J. Barton, 170 Woodlands Road, Barry, South Glamorgan CF6 6ED, Wales; Malcolm G. J. Macduff, 12 Merryman Garth, Hedon, Hull HU12 8NJ; John M. Newton, 16 Britten House, Britten Street, London SW3 6BU, both of England

[21] Appl. No.: 965,401
[22] PCT Filed: Jun. 19, 1991
[86] PCT No.: PCT/GB91/00984
§ 371 Date: Dec. 18, 1992
§ 102(e) Date: Dec. 18, 1992
[87] PCT Pub. No.: WO91/19563
PCT Pub. Date: Dec. 26, 1991

[30] Foreign Application Priority Data
Jun. 19, 1990 [GB] United Kingdom ............... 9013660
Aug. 23, 1990 [GB] United Kingdom ............... 9018553

[51] Int. Cl.$^5$ .............................................. A61K 9/14
[52] U.S. Cl. ................................... 424/489; 424/490; 424/458
[58] Field of Search ................. 424/489, 458, 455; 264/204, 206

[56] References Cited

U.S. PATENT DOCUMENTS 4,079,125 3/1978 Sipos .................................... 424/489
4,309,406 1/1982 Guley et al. ........................ 424/489

FOREIGN PATENT DOCUMENTS 0321527 6/1988 European Pat. Off. .
2209744A 5/1989 United Kingdom .
WO89/00079 1/1989 WIPO .

*Primary Examiner*—G. S. Kishore
*Assistant Examiner*—William E. Benston, Jr.
*Attorney, Agent, or Firm*—Nixon & Vanderhye

[57] ABSTRACT

A process for binding water-sensitive active materials in essentially non-aqueous systems.

15 Claims, No Drawings

RELEASABLY BOUND ACTIVE MATERIALS

The present invention relates to a process for releasably binding active materials in non-aqueous media.

It is well known to bind active materials in a binder to improve various characteristics such as attrition resistance, moderation of activity, ease of handling and reduction of dust problems. There are several methods of achieving such binding which include compaction, pelletisation, granulation, extrusion/ spheronisation and the like. A good summary of such techniques can be found in Kirk-Othmer's Encyclopaedia of Chemical Technology, Vol. 21, pp 77–102 under the section headed 'Size Enlargement'.

Amongst the various techniques employed granulation and extrusion/spheronisation are particularly useful and advantageous.

Granulation is a process for binding active material powders together into e.g. agglomerates. This technique usually mitigates problems of dust and materials handling and bestows other advantages such as improvement of flow; prevention of lump or cake formation; ease of metering, dosing and dispensing; enabling formation of uniform mixtures/blends without risk of segregation of the components in the mixture/blend; stabilisation of the active materials against premature degradation; controlling the release profile of the active materials; and enabling coatings to be applied on the active materials. Hitherto granulation techniques have mainly been carried out in aqueous systems, e.g. by mixing the active material with a binder and water to form a dough, shaping the dough into granules and drying the granules. Extrusion/spheronisation technique is used to convert an active material in powdered form into regular-sized, dense spheres. The purpose of this technique is usually to mitigate the problems of dust and materials handling, to allow complete and uniform mixing to be achieved with mixtures of powders without risk of segregation and to enable uniform coatings to be applied. As in the case of granulation, extrusion/spheronisation techniques have only been carried out hitherto in aqueous systems. Hence, the technique has been limited to treatment of active materials which are compatible with water. The technique consists essentially of (i) mixing a fine powder of the active material with a powdered binder and water to form a crumbly dough; (iii) extruding the dough to form tread-like material from the dough and (iii) placing the extrudate in a spheroniser so as to subject the extrudate to circular and tumbling motion whereby the extrudate is broken up into short pieces which then take the shape of a dense sphere.

By choice of appropriate formulations, the powders can be extruded into a smooth extrudate which (a) is friable, (b) does not crumble into a dusty powder in the spheroniser and (c) holds the moisture within the mixture thereby reducing stickiness and the risk of agglomeration. The extrusion/spheronisation technique is primarily used to produce spheres which are dense and have a tighter particle size distribution; have a relatively smooth surface; have complete and uniform mixing of the components without risk of segregation; facilitate application of coatings thereon; and protect the active material during storage and transportation.

In use, the spheres so produced are often required to disintegrate to deliver the active powder at the point of use.

In order to aid this disintegration, usually inorganic salts such as barium sulphate are used. In some cases surfactants are also used to help wetting of the spheres thereby aiding disintegration thereof in use. Swellable materials such as internally cross-linked cellulose have also been used to break up the spheres in use- Thus, the chosen formulation may contain several ingredients of which the active material content may vary from 0.1–99% w/w. The lower levels of loading within this range are used for highly potent active materials and where the required dosage rate is relatively low. Conversely, the higher loadings within this range are normally used when the required dosage rate is relatively high and/or the active material is of low potency. Specifically, the loading of the active materials in the bound product is rarely above 90% w/w.

The above-mentioned binding techniques and additives used to aid disintegration rely on water being used as the liquid medium and no data is available on the methods of binding water-sensitive active materials whether e.g. by granulation or by extrusion/spheronisation.

It has now been found that by careful choice of ingredients, it is possible to bind water-sensitive active materials in essentially non-aqueous systems.

Accordingly, the present invention is a process for binding active materials, especially water-sensitive active materials, said process comprising forming a dough from a formulation comprising an active material and a binder in particulate form using a liquid medium, shaping the dough and drying the shapes so formed characterised in that:

(a) the liquid medium is essentially non-aqueous;
(b) the binder is organophilic and is compatible with the medium.

Preferably, the active material is substantially insoluble or is only partially soluble in the medium and unreactive thereto.

By the term "water-sensitive" is meant here and throughout the specification that the active material (or a composition into which it is incorporated) when in contact with water undergoes some undesirable chemical and/or physical change and is therefore incapable of being bound in an aqueous system without undergoing such undesirable change(s). Examples of such changes include changes in (i) chemical structure such as e.g. hydrolysis of an ester, amide or lactone grouping to expose the free carboxyl and/or hydroxyl groups; and/or (ii) physical structure such as loss of integrity of e.g. particle or crystal size/structure.

By the term "partially soluble" as used herein and throughout the specification in respect of the solubility of the active material in the essentially non-aqueous liquid medium it is meant that the solubility of the active material in the medium is no more than 45 g/liter.

By the term "essentially non-aqueous" is meant here and throughout the specification that the medium used can tolerate small amounts of water therein provided that the amount of water is not such as to adversely react with the active material. An example of a medium which contains small amounts of water is commercially available ethanol which can be used even though it has around 4.8% w/w water.

The products produced by the process of the present invention are essentially different from those produced by processes in which active materials have a protective "coating" on the surface of preformed granules such as, e.g. in EP-A-390446 (English China Clays). This reference points out at page 3, lines 56–57 that any gaps left on the surface of the chemical reagent granules between the particles of the organophilic clay are sealed by particles of finely divided mineral material. In contrast to this, in the present invention, the clays perform the function of a "binder" to produce granules from the active materials. Moreover, appreciable quantities of the active material can be present and remain exposed on the surface of the granules formed by the process.

As active material can be chosen any particulate material which is pharmaceutically active in respect of the desired end use. Particular examples of water sensitive drugs include acetyl salicylic acid (asprin), procaine, cocaine, physostigmine, tetracaine, methyl dopate, dibukucaine, ergotamine benzyl-penicillin sodium, chloramphenicol, nitrazepan, chlordiazepoxide, penicillins and cephalosporins. -Other active materials which may advantageously be used in the processes of this invention include water soluble vitamins, bronchodilators such as salbutamol, highly deliquescent compounds such as potassium chloride. Further water-sensitive active materials include water soluble materials that form highly viscous solutions when dissolved in water. Examples of such materials are the sugars, including sucrose, dextrose, fructose and hydrophobic polymers such as cellulose derivatives. These active materials are difficult to spheronise in aqueous media and thus are suitable materials for use in the present invention. The invention may also utilise active materials which are not water-sensitive, in particular those actives which are more soluble in non-aqueous media.

As binder can be used a particulate material which is organophilic and is compatible with the liquid medium used. The binders used are suitably organophilic clays which are swellable and/or dispersable in organic solvents. Specific examples of such binders include the series of organophilic clays sold under the name Claytone (Regd. Trade Mark, ex. English China Clays International) and a specific example of this group of clays which is preferred is Claytone EM which is a bentonite clay containing approximately 40% w/w of a dimethyl ditallow quaternary ammonium salt. Other binders can also be used provided that they are pretreated to render them organophilic prior to incorporation in the process of the present invention.

The amount of binder used to produce the shapes, e.g. spheres of the present invention is suitably below 50% w/w, preferably from 5–30% w/w and most preferably from 7–20% w/w based on the total composition comprising the active material and the binder.

The liquid medium used in the formation of the dough is essentially a non-aqueous medium. Specific examples of solvents that may be used as the liquid medium in the process of the present invention include, aliphatic, cycloaliphatic or alicyclic alcohols having 1–10 carbon atoms, preferably 1–6 atoms; ketones having 1–9 carbon atoms, preferably aliphatic ketones having 1–6 carbon atoms; ethers having 1–10 carbon atoms, preferably aliphatic ethers which have 1–6 carbon atoms, and hydrocarbons which may be aliphatic, cycloaliphatic, alicyclic, aromatic or mixtures thereof. More preferably the alcohols may be methanol, ethanol, propanol or the butanols; the ketones may be acetone, methyl ethyl ketone or methyl isobutyl ketone; the ethers may be dimethyl ether, diethyl ether, dibutyl ether or alkoxy alkoxy ethers such as ethoxy propoxy propanol; and the hydrocarbons may be kerosine, paraffins, benzene, toluene or mixtures of these such as e.g. white spirit.

Where granulation is used for binding the active materials to produce the desired shapes, the active material and binder may be mixed thoroughly with the liquid medium to form a dough which can then be shaped into granules by known methods. The granules so produced can then be dried and screened to obtain the required particle size distribution.

Other methods involving shaping include: high shear mixer/ granulation; rotation of a wet mix of active material, binder and liquid medium in a pan drum or plate; and rotation of a dry mix of the active material and binder followed spraying of the liquid medium onto it. Thereafter the product can be dried to fix the shape. In these latter techniques no dough is produced as such but the 'green' product (the shaped product prior to drying) resulting from spraying the liquid medium can be considered for the purposes of this invention to be a 'dough' which is then dried to fix the shapes produced. In some of these techniques some form of screening may be required to select the preferred particle size.

Where extrusion/spheronisation Is used to produce dense spheres this technique has the advantage that no screening of the dense, spherical shapes so produced is required.

The active material, binder and the liquid medium are thoroughly mixed to form a dough. The specific proportions of each of the components in the mixture will vary with the nature of the individual components used and consistency required in the dough to enable extrusion and spheronisation.

Some general guidance in this respect can however be useful. For instance, if insufficient binder is used, the pressure required to extrude the mixture might be too high or the extrudate can disintegrate in the spheroniser to a dusty powder; if the liquid level is too low, the mixture can become difficult to extrude; if the liquid level is too high, this may result in stickiness and agglomeration of the mixture in the spheroniser.

The dough is then extruded by conventional techniques. Extrusion involves forcing the dough through a suitable orifice in order to produce continuously a body of uniform cross-section. The exact technique for forcing the dough and forming the orifice will vary with the type of extruder. For example, one type of extruder that can be used is that which uses a screw to feed the dough to a perforated screen and the dough is extruded through these perforations. In a variant to this system, the dough is fed into a rotating drum in contact with a rotating perforated screen. Other devices that may be used include a piston type extruder in which a movable arm squeezes the dough onto a perforated screen. Yet another device that can be used is extrusion of a dough by the pressure of a ram through a die.

Fundamentally, the material to be extruded must be in plastic condition. The condition may be achieved by choice of a suitable formulation, or may be achieved by the use of heat, especially in the case of for instance plastics and metals. The size of the orifice would be determined by the ultimate size of the spheres desired and would normally be the final diameter of the spherical product. It would be understood that the particle size of the ingredients forming the dough would be substantially less than the size of the orifice and the particles would ideally be of a diameter which is less than half the diameter of the orifice. Sufficient compaction should be achieved during the extrusion phase to ensure adequate 'green' strength in the extrudate. However, the compaction should not be so Great that the subsequent spheronisation and, where applicable disintegration in use are hampered.

A spheroniser usually consists of a corrugated disc spinning about a vertical axis and the disc is housed in a cylindrical housing with vertical walls along the edges of the disc. When an extrudate Is dropped on the spinning disc, the extrudate tends to break into smaller pieces and is simultaneously flung towards the walls of the housing by centrifugal force. This action and the dragging action of the corrugations cause the extrudate pieces to spherise either by impact or by coalesence with other pieces to form the spheres. A typical spheroniser is that sold by GB Caleva Ltd. The extrudate is placed on a 20.3 cm disc and spun e.g. at about 100 rpm for a few minutes to result in a spherical bound product. The amount of the extrudate placed on the disc will depend on the size of the disc. Too much or too little of the extrudate will not give optimum spheres. For a disc which is 25 cm in diameter, the amount of extrudate placed thereon is suitably from 200–1000 g. This product is then dried at a temperature from 20°–60° C., preferably around 45° C. to drive off the surplus liquid components leaving behind robust spheres.

The formulations used to produce the dense spheres of active materials bound in a binder can also optionally include other ingredients depending upon the end use of the spheres. The spheres thus produced are usually hydrophobic and if the active ingredient is to be released in an aqueous environment, appropriate aids to disintegrate the spheres in situ can be used. The nature of these other optional ingredients will depend upon the role they are expected to perform. For instance, it may be necessary for the spheres to disintegrate rapidly or slowly, or, it may be necessary to improve the wettability of the spheres or otherwise, or, it may be desirable to achieve the disintegration by a swelling action. Specific examples of such other ingredients include Ac-di-sol (Regd. Trade Mark, ex FMC Corporation) which is a cross-linked sodium carboxymethyl cellulose; Tween 81 (Regd- Trade Mark) which is a polyoxyethylene sorbitan oleate ester; barium sulphate, calcium carbonate and magnesium carbonate- The amount of such aids used will, as stated above, depend upon the desired end use of the active materials but will usually be no more than 30% w/w, preferably from 5–20% w/w of the total solids content in the formulation.

Robust spheres could be obtained using from 10–25% w/w of the organophilic clay based on the total solids content in the formulation. These spheres however did not disintegrate and release the active ingredient when exposed to an aqueous environment.

As other additives and disintegration aids are added to the formulation, the levels of binder and liquid medium may have to be adjusted.

A feature of the invention is that although the bound product is robust and dust-free, the product upon contact with water is capable of disintegrating in such a way that the binder material disintegrates (with or without disintegration aids which are usually added to control the speed of disintegration as desired). This is particularly useful where the active material bound is to be released—slowly or rapidly, as desired—into the aqueous environment with which It is in contact. A particularly suitable area where this is useful is in pharmaceutical formulations, especially powder formulations where an active material such as a drug can be released into the gastro-intestinal tract as desired by controlling the rate of disintegration without fear of losing the active material during storage of the powder formulation.

Thus it can be seen that the process of the present invention enables the active material to be releasably bound with a binder which is capable of releasing the active material upon contact with an aqueous environment. The products of the processes of this invention find use as pharmaceutical dosage forms. In particular the dense spheres produced by a process of extrusion/spheronisation may be metered into a capsule to provide a pharmaceutical dosage form. The dense spheres may also be coated prior to being placed in the capsule in order to further modify the release properties of the dosage form. Additionally the dense spheres may be compacted to form tablets.

The following description based on the extrusion/spheronisation of a bleach activator (2MB4) will therefore be used to illustrate the principles involved in the process of the present invention.

By using the process of the present invention spheres can be produced which contain up to 95% w/w of water-sensitive active materials bound in the binder.

The present invention is further illustrated with references to the following Examples:

Using 2MB4 as a specific example of the active material, Claytone EM as the binder and white spirit as the liquid medium Examples according to the invention were performed. In other comparative tests (not according to the invention) binders were used which are not organophilic clays.

To produce the dough, 200g of 2MB4 <active material), 30g Claytone EM (organophilic binder) and 25g white spirit were mixed thoroughly in a Kenwood Chef mechanical food mixer for about 10 minutes at ambient temperature. The dough so produced was ideal for extrusion.

The extrusion of the dough was carried out by loading the dough into an extruder comprising a metallic barrel provided with a ram and a die. The metallic barrel had an internal diameter of 1.5 cm and a length of 25 cm. The dough was packed into this barrel (50 g at a time) then forced through a 1 mm orifice in the die. The length of the orifice was 2 mm. The ram used to extrude the dough force remained essentially steady at 5000 N for the full extent of travelled at 100 mm/min and the force applied was about 5000 N. The extrusion was performed at ambient temperature.

The above experiment was successfully repeated in a commercial gravity feed extruder manufactured by Alexanderwerk (Model DFSC 60).

The extrudate was then placed in a 20.3 cm diameter spheroniser (ex GB Clavea Ltd.) and spun approximately at 1000 rpm. After about 5 minutes, the extrudate had formed into good spheres being substantially from 500–2000 micrometers in diameter. The spheres produced were robust enough to withstand continuous spheronisation of at least 10 minutes without sticking together or breaking down into dusty particles.

By using the above general procedure, spheres were produced with Claytone EM levels ranging from 5–30% w/w and the white spirit levels adjusted to give the right process characteristics (i.e. smooth extrudate and non-dusting, non-sticky spheres). In formulations containing disintegrants and other formulation aids, a similar procedure to the above was adopted, the dry ingredients being gently mixed together first and the wet Ingredients such as white spirit and Tween 81

(Regd. Trade Mark) being added before mixing vigorously for 10 minutes.

The best spheres consisted of 200 g of 2 MB4, 30 g Claytone EM and 25 g white spirit.

In order to illustrate the function of the aids to disintegrate the spheres so formed during use, spheres were produced in the same manner as described but now using 2MB4, 9-12% w/w of Claytone EM, 10-16% w/w of Ac-di-sol and up to 4% w/w of Tween 81. The spheres formed using the above formulation were then placed in cold tap water and the time taken to disintegrate was measured. The spheres disintegrated within 1-5 minutes of exposure to an aqueous environment.

The results achieved using various combinations of the components to produce spheres, where possible, and their ultimate performance in an aqueous environment are summarised below together with annotated processing comments. From these it is clear that it is essential to use an organophilic binder to achieve the desired results.

The method described above was repeated to show the extrusion/spheronisation or acetylsalicylic acid as an example of a water-sensitive active material. The parameters of the above procedures were largely unchanged, the extrusion force was increased to 20,000 N and a longer spheronisation time (20 minutes) was needed.

The best spheres consisted of 200g acetylsalicylic acid, 30g Claytone EM and 25 g white spirit.

Further spheres were made including 10-16% w/w of Ac-Di-Sol and 2-5% w/w Tween 81 with 100 g acetylsalicylic acid. Slightly more white spirit (30-35g) was needed.

These changes in the basic procedure making spheres of acetylsalicylic acid and the like, will be well understood by those skilled in the art as attributable to the nature of the active material.

TABLE 1

| | Table of Formulation Runs | | | | |
|---|---|---|---|---|---|
| | Comparative Tests 1, 2 & 3 | | | Example 1 | Example 2 |
| MB4 | 40 g (80%) | 40 g (80%) | 40 g (80%) | 200 g (87%) | 200 g (87%) |
| Claytone EM | 5 g (10%) | — | — | 30 g (13%) | 30 g (13%) |
| White Spirit | 5 g | 5 g | 5 g | 25 g | 25 g |
| Bentonite Clay ASB 60S | 10 g (20%) | — | — | | |
| Hectorite 200M | — | 10 g (20%) | — | | |
| Attagel 50 | — | — | 10 g (20%) | | |
| Comments: | Separated on extrusion | Separated on extrusion | Separated on extrusion | Good | Good |

Table key:
g = grams
% = percentage weight

TABLE 2

| | Table of Formulation Runs | |
|---|---|---|
| Product | Example 3 | Example 4 |
| 2MB4 | 200 g (76%) | 200 g (78%) |
| Claytone EM | 25 g (10%) | 25 g (11%) |
| White Spirit | 25 g | 25 g |
| Ac-Di-Sol | 35 g (15%) | 25 g (11%) |
| Tween 81 | 5 g (2%) | 7 g (3%) |

TABLE 2-continued

| | Table of Formulation Runs | |
|---|---|---|
| | Example 3 | Example 4 |
| Comments: | Good spheres* | Good spheres* |

Table Key:
g = grams
% = percentage weight after solvent evaporation
*active material readily released in water in 1-2 mins.

We claim:

1. A process for binding water-sensitive pharmaceutically active materials, said process comprising the steps of:
   forming a dough from a formulation comprising a water-sensitive pharmaceutically active material and a binder in particulate form using an essentially non-aqueous liquid medium;
   shaping the dough to form a shaped dough; and
   drying the shaped dough;
   said binder being organophilic and compatible with said essentially non-aqueous medium.

2. A process according to claim 1, wherein the active material is substantially insoluble or is only partially soluble in said medium and unreactive thereto.

3. A process according to claim 1, wherein the binder is an organophilic clay which is swellable or dispersible in organic solvents.

4. A process according to claim 3, wherein the organophilic clay is a Claytone clay.

5. A process according to claim 3, wherein the organophilic clay is Claytone EM.

6. A process according to claim 1, wherein the amount of binder used to produce the shape dough is below 50% w/w based on the total composition comprised of the active material and the binder.

7. A process according to claim 1, wherein the liquid medium is selected from the group consisting of aliphatic, cycloaliphatic or alicyclic alcohols having 1-10 carbon atoms; ketones having 2-b 9 carbon atoms; ethers having 2-10 carbon atoms; and hydrocarbons which may be aliphatic, cycloaliphatic, alicyclic or aromatic, or mixtures thereof.

8. A process according to claim 1, wherein the liquid medium is selected from the group consisting of methanol, ethanol, propanol or the butanols; acetone, methyl ethyl ketone or methyl isobutyl ketone; dimethyl ether, diethyl ether, dibutyl ether or alkoxy alkoxy ethers; and kerosine, paraffins, benzene, toluene or white spirit.

9. A process according to claim 1, wherein the dough is shaped in dense spheres by an extrusion/spheronization technique.

10. A process according to claim 1, wherein the formulation used to produce the dough contains one or more ingredients selected from the group consisting of disintegration aids, swelling aids and surfactants.

11. A process according to claim 10, wherein the disintegration aid is selected from the group consisting of a cross-linked carboxymethyl cellulose, a polyoxyethylene sorbitan oleate ester, barium sulphate, calcium carbonate or magnesium carbonate.

12. A process according to claim 10, wherein the ingredients are present in an amount up to 30% w/w of the total solids contents in the formulation.

13. A process according to claim 3, wherein the amount of organophilic clay used is from 10–25% w/w of the total solids content in the formulation.

14. A pharmaceutical dosage form comprising a capsule containing a product produced by a process according to claim 1.

15. A pharmaceutical dosage from comprising a tablet formed by compacting products produced by a process according to claim 1.

* * * * *